United States Patent
Varnham et al.

(10) Patent No.: US 7,120,339 B2
(45) Date of Patent: Oct. 10, 2006

(54) POLARIZATION-DEPENDENT OPTICAL FIBRE AMPLIFIER

(75) Inventors: Malcolm Paul Varnham, Alresford (GB); Paul William Turner, Eastleigh (GB); Mikhail Nickolaos Zervas, Southampton (GB)

(73) Assignee: SPI Lasers UK Ltd, Southampton (GB)

( * ) Notice: Subject to any disclaimer, the term of this patent is extended or adjusted under 35 U.S.C. 154(b) by 0 days.

(21) Appl. No.: 10/528,895

(22) PCT Filed: Sep. 25, 2003

(86) PCT No.: PCT/GB03/04088

§ 371 (c)(1),
(2), (4) Date: Mar. 23, 2005

(87) PCT Pub. No.: WO2004/030165

PCT Pub. Date: Apr. 8, 2004

(65) Prior Publication Data

US 2006/0013545 A1    Jan. 19, 2006

(30) Foreign Application Priority Data

Sep. 25, 2002  (GB)  ................. 0222252.9

(51) Int. Cl.
*G02B 6/02*  (2006.01)
(52) U.S. Cl. .................. 385/123; 385/126
(58) Field of Classification Search ......... 385/123–128
See application file for complete search history.

(56) References Cited

U.S. PATENT DOCUMENTS 6,563,995 B1 *   5/2003  Keaton et al. ............... 385/127
6,825,974 B1    11/2004  Kliner et al.

FOREIGN PATENT DOCUMENTS

WO       WO 00/02290        1/2000

OTHER PUBLICATIONS

"Suppression of Stimulated Brillouin Scattering by Intentionally Induced Periodical Residual-Strain in Single-Mode Optical Fibers", IEICE Transactions on Communications, Tokyo, JP, vol. E76-B, No. 4, Apr. 1, 1993, pp. 345-350, XP000378264, ISSN: 0916-8516.
M. P. Varnham, et al.; "Single-polarisation operations of highly birefringement bow-tie optical fibres", Electronics Letters, UK, vol. 19, No. 7, Mar. 31, 1983, pp. 246-247, XP02269184, ISSN 0013-5194.
Tajima, K.: "ER3+' -Dpoed Single-Polarisation Optical Fibres", Electronics Letters, UK, vol. 26, No. 18, Aug. 30, 1990, pp. 1498-1499, XP000108664, ISSN: 0013-5194.
Malcolm Paul Varnham, A Study of Highly Birefringent Optical Fibres, PhD Thesis, Apr. 1984, Chapter 6, pp. 84-138, University of Southampton, Southampton, UK.

* cited by examiner

*Primary Examiner*—Kevin S. Wood
(74) *Attorney, Agent, or Firm*—Reidlaw. L.L.C.; John S. Reid

(57) ABSTRACT

An optical fibre including a waveguide and at least one stress applying region is described. The waveguide is defined by a numerical aperture, and the stress applying region is defined by a depressed refractive index. The optical fibre is configured such that the waveguide supports at least two polarised fundamental modes, two polarized first second-order modes, and two polarised second second-order modes. The waveguide includes comprises a gain medium. The stress applying region, the waveguide and the disposition of the gain medium are such as to provide preferential guidance to at least one of the modes at an operating wavelength.

20 Claims, 7 Drawing Sheets

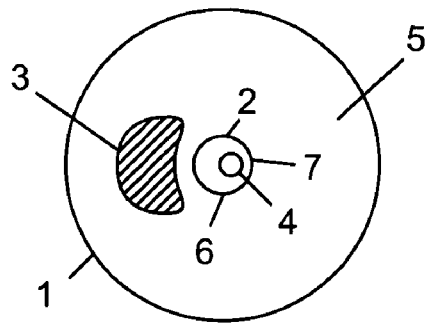
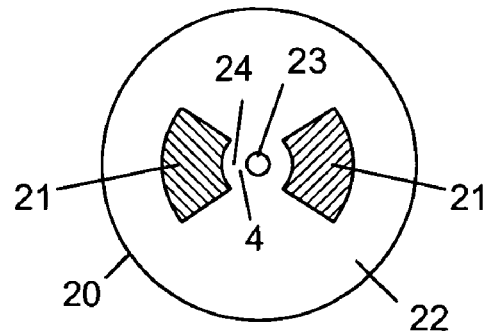
FIG 1  FIG 2
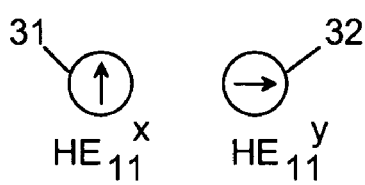
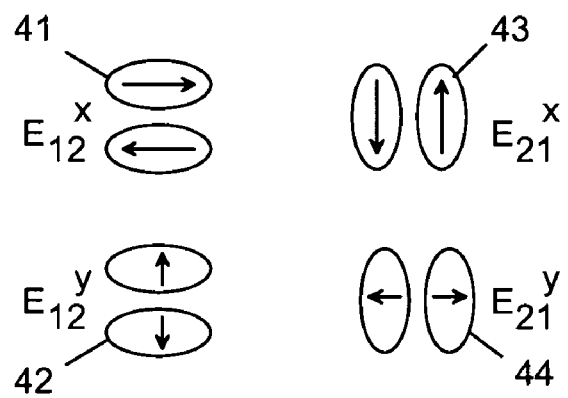
FIG 3  FIG 4
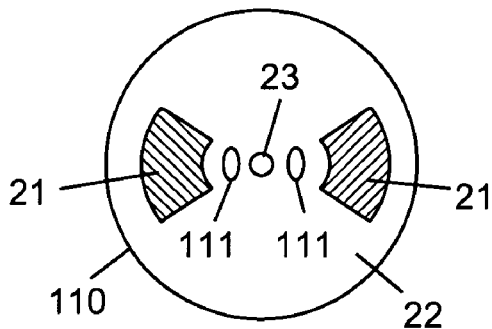
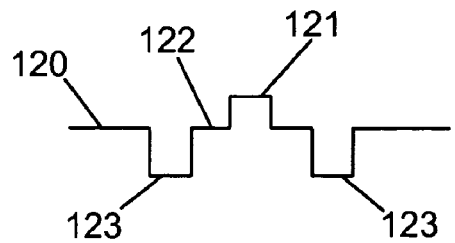
FIG 11  FIG 12

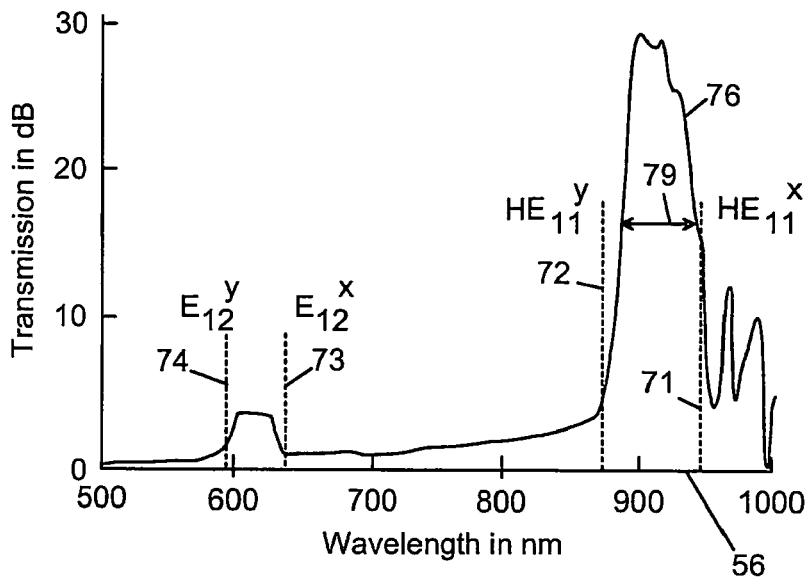
FIG 7
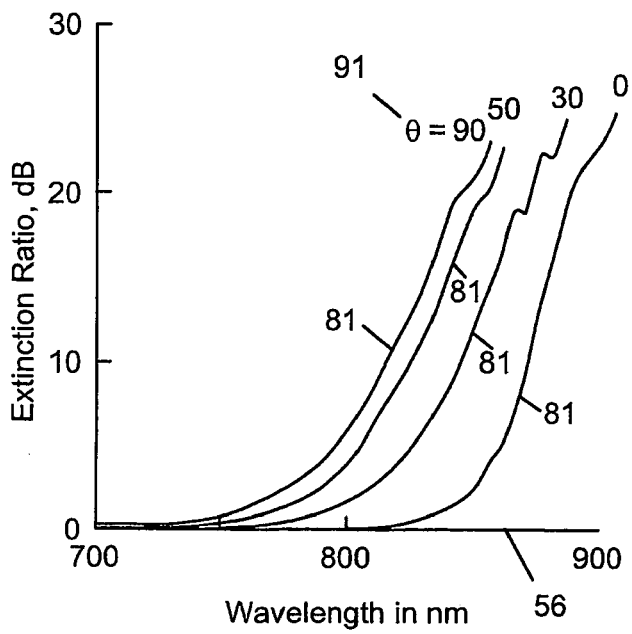
FIG 8
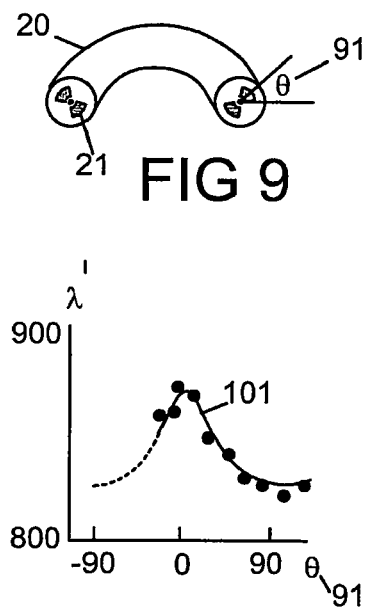
FIG 9
FIG 10

POLARIZATION-DEPENDENT OPTICAL FIBRE AMPLIFIER

CROSS REFERENCE TO RELATED APPLICATIONS

The present application is a U.S. National Stage filing of Patent Cooperation Treaty ("PCT") application serial number PCT/GB2003/004088, filed 24 Sep. 2003 (International Filing Date), which in turn claims priority to United Kingdom (Great Britain) Patent Application Serial Number GB0222252.9, filed 25 Sep. 2002.

FIELD OF INVENTION

This invention relates to apparatus comprising an optical fibre. The apparatus may form the basis of high-power lasers and amplifiers.

BACKGROUND TO THE INVENTION

Many applications of optical fibres required control of either polarisation or the mode shape. Particular examples are found in high-power fibre lasers and amplifiers whose optical output is further processed by polarisation-dependent devices such as modulators and frequency converters. Although polarisation-maintaining fibres exist, these do not necessarily provide a single polarisation output, particularly at high powers where reliable polarising optics can be expensive, unreliable, and difficult to procure. A requirement therefore exists for an active fibre that can be incorporated into a high-power fibre laser or amplifier and which enables the laser or amplifier to be operable as a single-polarisation source.

Stimulated Brillouin scattering provides a limitation for high-power fibre lasers and optical amplifiers. Light travelling down the fibre excites an acoustic wave which reflects the light, the reflected light being shifted in wavelength by the Brillouin wavelength shift. Different glass materials have different Brillouin wavelength shifts and Brillouin bandwidths.

It is known that the stimulated Brillouin scattering threshold can be increased by varying the materials along an optical fibre, by inducing a temperature gradient along a fibre, and by utilizing glasses having different Brillouin shifts across the cross section of a fibre.

It is also known that the stimulated Brillouin scattering threshold can be increased using so-called large mode area fibres. Such fibres can have relatively low numerical apertures and can be operated multi-moded and bent such as to provide higher losses for the higher-order modes as compared to the fundamental mode.

There is a need for a fibre that can be used in single-frequency lasers and amplifiers. There is a related need for a fibre that has a higher stimulated Brillouin scattering threshold.

SUMMARY OF THE INVENTION

According to a non-limiting embodiment of the present invention there is provided apparatus comprising an optical fibre having a waveguide and at least one stress applying region: in which the waveguide is defined by a numerical aperture; the stress applying region has a depressed refractive index; the optical fibre is configured such that the waveguide supports at least two polarised fundamental modes, two polarised first second-order modes, and two polarised second second-order modes; the waveguide comprises a gain medium; and the stress applying region, the waveguide and the disposition of the gain medium are such as to provide preferential guidance to at least one of the modes at an operating wavelength.

An advantage of the invention is that the apparatus can be readily configured to provide a single polarised mode from a fibre laser, and can do so at high power levels. This is particularly important when the output from the laser is to be processed by other devices such as frequency converters or phase modulators.

The optical fibre may be bent.

The gain medium may comprise one or more rare-earth dopants.

The rare earth dopant may comprise one or more of Ytterbium, Erbium, Neodymium, Praseodymium, Thulium, Samarium, Holmium, Europium, Terbium, and Dysprosium.

At least one of the fundamental modes, the first second-order modes, and the second second-order modes may be leaky at the operating wavelength.

The optical fibre is preferably configured to operate as a single-polarisation optical fibre at the operating wavelength.

The optical fibre may be tapered along its length.

The waveguide may be tapered along its length.

The numerical aperture may correspond to an index difference less than 0.0035.

The numerical aperture may correspond to an index difference less than 0.003.

The numerical aperture may correspond to an index difference less than 0.0025.

The numerical aperture may correspond to an index difference less than 0.002.

The optical fibre may comprise a photosensitive region.

The photosensitive region may be at least partly in the stress applying region.

The photosensitive region may be at least partly in the waveguide.

The optical fibre may be defined by a stimulated Brillouin scattering threshold, and the fibre may have been exposed to ultraviolet radiation at least partly along its length in order to increase the stimulated Brillouin scattering threshold.

The optical fibre may be defined by a stimulated Brillouin scattering threshold, and the optical fibre may have been exposed to heat treatment at least partly along its length in order to increase the stimulated Brillouin scattering threshold.

The apparatus may be in the form of an optical amplifying device. The optical amplifying device may provide single-polarisation operation. The optical amplifying device may be an optical amplifier, a laser, a master oscillator power amplifier, or a source of amplified spontaneous emission. In use, the optical amplifying device may emit optical radiation. The optical radiation may be pulsed, modulated or continuous wave.

BRIEF DESCRIPTION OF THE DRAWINGS

Embodiments of the invention will now be described solely by way of example and with reference to the accompanying drawings in which:

FIG. 1 shows apparatus according to the present invention;

FIG. 2 shows an optical fibre comprising two stress applying regions;

FIG. 3 shows the fundamental modes of an optical fibre;

FIG. 4 shows the second-order modes of an optical fibre;

FIG. 7 shows an operating window in which single-polarisation operation is achieved;

FIG. 8 shows the variation in extinction ratio with wavelength and azimuth;

FIG. 9 defines azimuth;

FIG. 10 shows the variation of wavelength with azimuth for a 15 dB extinction ratio;

FIG. 11 shows an optical fibre with a gain medium;

FIG. 12 shows a refractive index variation of an optical fibre;

DETAILED DESCRIPTION OF PREFERRED EMBODIMENTS OF THE INVENTION

Figure 5:
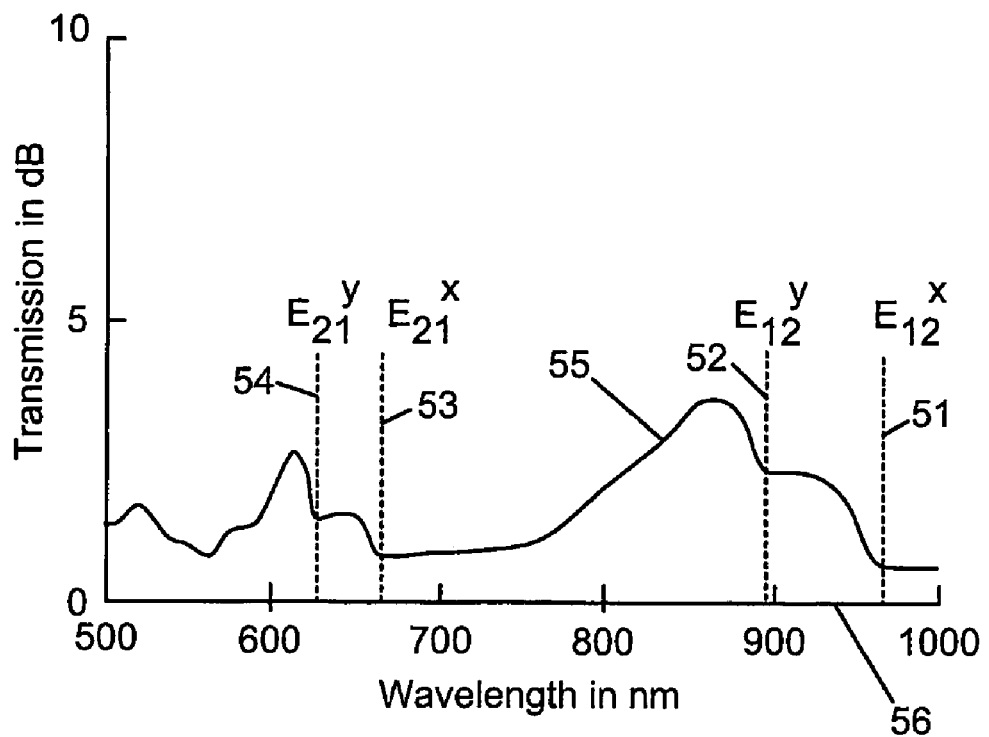
FIG. 5 shows transmission of an optical fibre with respect to wavelength.

With reference to FIG. 1, there is provided apparatus comprising an optical fibre 1 having a waveguide 2 and at least one stress applying region 3: in which the waveguide 2 is defined by a numerical aperture 6; the stress applying region 3 has a depressed refractive index; the optical fibre 1 is configured such that the waveguide 2 supports at least two polarised fundamental modes, two polarised first second-order modes, and two polarised second second-order modes; the waveguide 2 comprises a gain medium 4; and the stress applying region 3, the waveguide 2 and the disposition of the gain medium 4 are such as to provide preferential guidance to at least one of the modes at an operating wavelength. The modes are shown below in FIGS. 3 and 4 as mode as numbers 31, 32, 41, 42, 43 and 44.

By depressed refractive index, it is meant that the refractive index of the stress applying region 3 is less than the average refractive index of the cladding 5.

The numerical aperture 6 is related to the angle emitted by light guided by the waveguide 2 at one of its ends. This definition is more general than defining it with respect to the refractive indices of the core 7 and cladding 5, and can, for example, be used with a greater range of optical fibres such as doped core and microstructured (or holey) fibres.

The waveguide 2 can be a microstructured fibre containing longitudinally extending holes along its length. The holes can be filled with air or other material(s) with low refractive index.

The optical fibre 1 can be circular, oval, elliptical or have a rectangular cross-section. The optical fibre 1 is preferably coated.

FIG. 2 shows a cross-section of an optical fibre 20 comprising a substrate 22, stress applying regions 21, a core 23 and an inner cladding region 24. The core 23 and inner cladding region 24 comprise the waveguide 2. The stress applying regions 21 are typically doped with boron or boron co-doped with germania and typically have a depressed refractive index with respect to the refractive index of the substrate 22. The substrate 22 is typically silica. The gain medium 4 is shown as being in the inner cladding region 24, which is useful for reducing the overlap (and hence increasing the potential amount of stored energy with the fibre) between the guided modes and the gain medium 4.

FIG. 3 shows the x- and y-polarised fundamental modes 31, 32 of the fibre 20, labelled $HE_{11}^x$ and $HE_{11}^y$ respectively. The fundamental modes 31, 32 have a maximum amplitude located approximately at the centre of the core 23.

FIG. 4 shows the four second-order modes 41, 42, 43, 44 of the fibre 20. These can be separated into x- and y-polarised first second-order modes 41, 42 and x- and y-polarised second second-order modes 43, 44. The second-order modes 41, 42, 43, 44 have a minimum located approximately at the centre of the core 23.

FIG. 5 shows the relative transmission 55 of the optical fibre 20 measured versus wavelength 56 of the optical fibre 20 when bent compared to when straight. Bending the optical fibre has the effect of increasing losses of modes that are operating near to cut off. The cut-offs of the four second modes 41, 42, 43, 44 are labelled as 51, 52, 53, 54 respectively. The depressed index of the stress applying regions 21 has the effect of reducing the cut-off wavelength of the second second-order modes 43, 44. The depressed regions 21 provides preferential guidance to the first second-order modes 41, 42 compared to the second second-order modes 43, 44.

Figure 6:
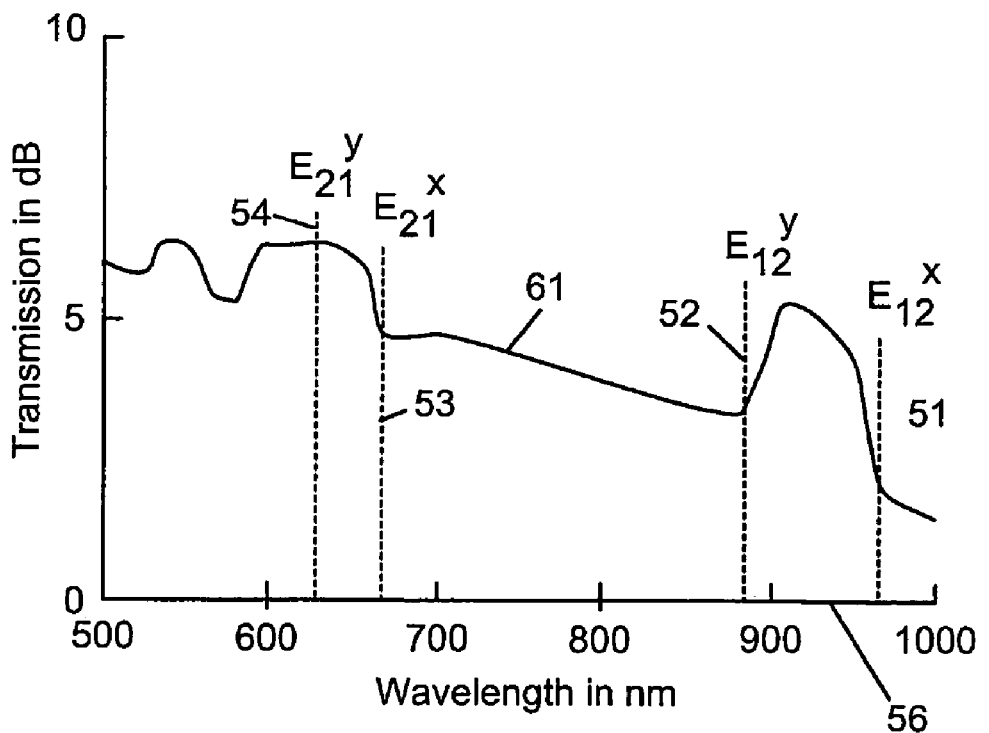
FIG. 6 shows the relative transmission of two polarisations in an optical fibre.

FIG. 6 shows the relative transmission 61 of the optical fibre 20 measured versus wavelength 56 for x-polarised light compared to y-polarised light.

FIG. 7 shows the relative transmission 76 of x- and y-polarised length versus wavelength 56 of a different length of the optical fibre 20, drawn to have a smaller diameter. The cut-off wavelengths 71, 72 of the two fundamental modes 31, 32, and the cut-off wavelengths 73, 74 of the two first second-order modes 41, 42 are identified.

FIG. 8 shows the extinction ratio 81 of y-polarised light compared to x-polarised light measured through the optical fibre 20 as a function of wavelength 56 and azimuth θ 91 of the bend direction relative to the stress applying regions 21 as further defined in FIG. 9. The wavelength variation 101 for a 15 dB extinction is shown plotted against azimuth 91 in FIG. 10. FIGS. 8, 9 and 10 demonstrate that the bend losses can be tuned by bending the optical fibre 20 and by controlling the azimuth 91 of the bend radius.

FIG. 11 shows an optical fibre 110 comprising two gain mediums 111. The gain medium 111 can comprises one or more rare-earth dopants. The rare earth dopant comprises one or more of Ytterbium, Erbium, Neodymium, Praseodymium, Thulium, Samarium, Holmium, Europium, Terbium, and Dysprosium. Preferably the rare earth dopant is Ytterbium or Erbium. The Erbium may be co-doped with Ytterbium. The disposition of the gain medium 111 is that it provides preferential gain for the fundamental modes 31, 32 and the second second-order modes 43, 44 compared to the first second-order modes 41, 42. This is because the first second-order modes 41, 42 have a null along the axis. Thus when the optical fibre 110 is bent, the depressed index regions 21 will cause leakiness of the second second-order modes 43, 44, and the bend will cause additional leakage of the first second-order modes 41, 42. The preferential gain afforded by the disposition of the gain medium 111 will offset losses seen by the fundamental modes 31, 32 induced by the bend.

Alternatively or additionally, the gain medium 4 can be located in the core 23 in a region where the intensity of the fundamental modes 31, 32 is greater than the intensity of the first second-order modes 41, 42.

FIG. 7 shows a wavelength window 79 in which the optical fibre 20 operates as a single-polarisation optical fibre. A similar wavelength window will exist for the optical fibre 110. It is preferred that the optical fibre 110 is configured to operate as a single-polarisation optical fibre at its operating wavelength. This is achieved by appropriate choices of the refractive index profiles, relative dimensions and the fibre diameter.

FIG. 12 shows the refractive index profile 120 across the x-axis of the optical fibre 110. The refractive index of the core $n_{co}$ 121 is raised with respect to the refractive index of the cladding $n_{cl}$ 122. The refractive index of the stress applying regions ns 123 is depressed with respect to the cladding $n_{cl}$ 122. The refractive index of the stress applying regions ns 123 is typically depressed by about 0.0001 to 0.01 with respect to the refractive index of the cladding $n_{cl}$ 122.

The refractive index $n_{co}$ 121 is typically raised by about 0.001 to 0.005 with respect to the refractive index of the cladding $n_{cl}$ 122. However, it may be advantageous to reduce the refractive index of the core $n_{co}$ 121 to 0.0005 to 0.001 with respect to the substrate 22 in order to reduce the numerical aperture 6 of the fibre 110 further.

The refractive index difference between core and cladding is often expressed as a numerical aperture defined by NA= $(n_{co}^2 - n_{cl}^2)^{0.5}$.

In many applications, it is beneficial to increase the threshold at which non-linear effects such as stimulated Brillouin scattering and stimulated Raman scattering occur. This can be achieved by increasing the spot size of the modes propagating in the fibre. One way to increase the spot size is to decrease the numerical aperture 6 below that of conventional telecom fibres, and to increase the diameter of the waveguide 2. It is advantageous for the numerical aperture 6 to be less than 0.1, and preferably in the range 0.06 to 0.08. A numerical aperture of 0.1 corresponds to a refractive index difference between core and cladding $n_{co} - n_{cl}$ of around 0.0035 in a silica fibre. Numerical apertures of 0.06 to 0.08 correspond to refractive index differences between core and cladding $n_{co} - n_{cl}$ of around 0.0012 to 0.0022. The numerical aperture 6 can be decreased further to be in the range 0.02 to 0.06, corresponding to index differences of around 0.0002 to 0.0012, which can be achieved using stress guidance and/or low core dopant concentrations. Alternatively, these numerical apertures 6 can be achieved using silica cores and depressed claddings and/or microstructure holes in the cladding. By stress guidance, it is meant forming a waveguide by virtue of the photoelastic effect. In this case, the stress applying regions 3 stress fibre, and in particular the area surrounding the core 7 which has the effect of raising the refractive index seen by x-polarised light. The core 7 can then guide x-polarised light without utilizing traditional core dopants such as germania or phosphorus.

The core 23 may comprise a more complex refractive index profile, including at least one ring and index depressions, the refractive index $n_{co}$ 121 thus being interpreted as an effective refractive index—that is the equivalent refractive index of a conventional step-index fibre that guides light with the same spot size as would be guided in the optical fibre 110.

Further increases in the stimulated Brillouin threshold can be achieved by tapering the optical fibre 1 along its length. Additionally or alternatively, the waveguide 2 can be tapered along its length. The optical fibre 1 can be twisted along its length, either during the fibre drawing process or after the fibre is drawn. Changes in stress along its length can also be achieved by bending or coiling the fibre with different bend radii along its length.

Figure 13:
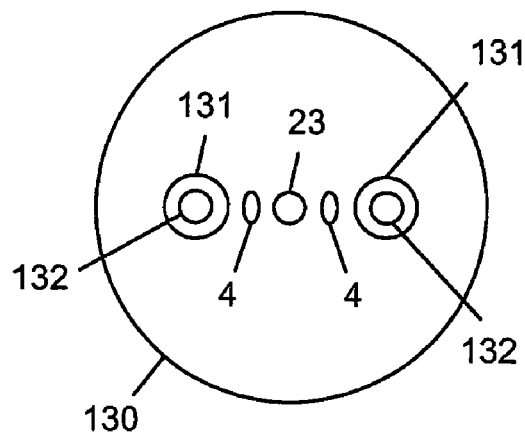
FIG. 13 shows an optical fibre with photosensitive regions in the stress applying regions.

FIG. 13 shows an optical fibre 130 comprising round stress applying regions 131. Such an optical fibre is typically referred to as a PANDA optical fibre. The design features of the optical fibre 130 are preferably similar to those described with reference to FIGS. 2 to 12, except that the stress applying regions 131 are approximately circular. The stress applying regions 131 comprise a photosensitive region 132. The photosensitive region 132 may be boron doped silica co-doped with germania.

Figure 14:
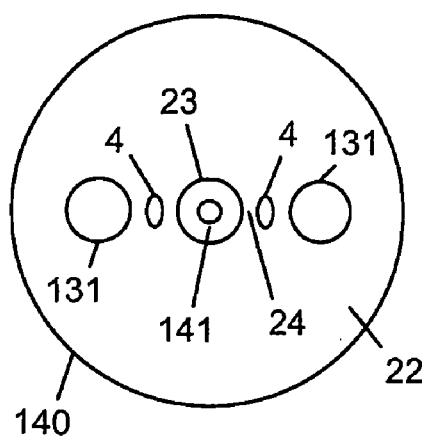
FIG. 14 shows an optical fibre with photosensitive regions in the core.

FIG. 14 shows an optical fibre 140 in which the core 23 comprises a photosensitive region 141. The photosensitive region may also be located wholly or partly in the core 23 and/or partly in the stress applying regions 131. Alternatively or additionally, the photosensitive region may be located in the inner cladding 24 or substrate 22. The photosensitive region 141 may be germania doped silica, or if located in the inner cladding 24 or substrate 22, germania silica co-doped with boron.

Exposing the optical fibre 130, 140 to ultraviolet light (for example as used in the manufacture of fibre Bragg gratings) or heat treating the optical fibre 130, 140 will change the stresses within the fibre cross-section and can increase the stimulated Brillouin scattering threshold. It is preferred that such irradiation or heat treatment is varied along the optical fibre 130, 140.

Figure 15:
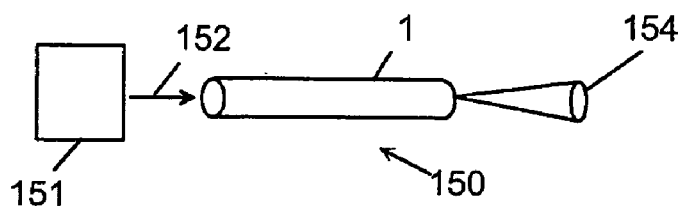
FIG. 15 shows apparatus in the form of an amplifying optical device.

FIG. 15 shows apparatus in the form of an optical amplifying device 150 comprising the optical fibre 153 and a source 151 of pump radiation 152. The optical amplifying device 150 may be an optical amplifier, a laser, a master oscillator power amplifier, or a source of amplified spontaneous emission. In use, the optical amplifying device 150 may emit optical radiation 154. The optical radiation 154 may be pulsed, modulated or continuous wave.

It is preferred that in use the optical fibre 1 is bent. With reference to FIGS. 8, 9 and 10, it is seen that depending on the design of the optical fibre 1, single-polarisation operation at the operating wavelength of the optical amplifying device 150 can be achieved by varying the azimuth 91 of the optical fibre 1.

Figure 16:
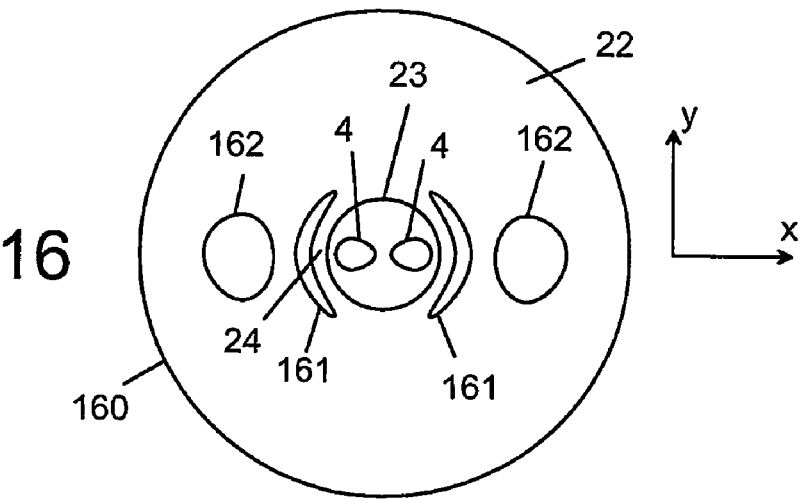
FIG. 16 shows an optical fibre comprising depressed index regions.

FIG. 16 shows a cross-section of an optical fibre 160 having the gain medium 4 in the core 23. The optical fibre 160 also comprises a depressed cladding region 161 and two stress applying regions 162. The purpose of the depressed cladding region 161 is to cut-off the second second-order modes 43, 44 defined in FIG. 4, and the purpose of the stress applying regions 162 is to induce stress birefringence and/or to create a window of single-polarisation operation 79 as defined in FIG. 7. In certain embodiments of the present invention, the optical fibre 160 may have one or both of the depressed cladding regions 161 and stress applying regions 162.

Figure 17:
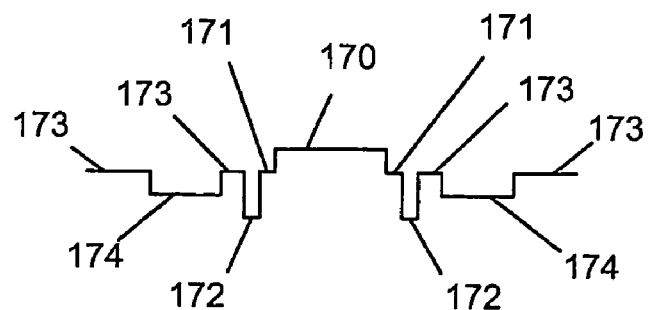
FIG. 17 shows the refractive index profile of the fibre shown in FIG. 16.

FIG. 17 shows the refractive index profile of the optical fibre 160 along the x-axis defined in FIG. 6. The core 4 has a raised index 170, the depressed cladding regions 161 a depressed index 172, and the stress applying regions 162 a depressed index 174 compared to the index 173 of the substrate 22. The refractive index 171 of the inner cladding 24 is approximately matched to the substrate 22. The index 174 of the stress applying regions 162 may alternatively be matched to the index 173 of the substrate 22, or may even be raised. It is preferred however to depress the index 174 of the stress applying regions 162.

Figure 18:
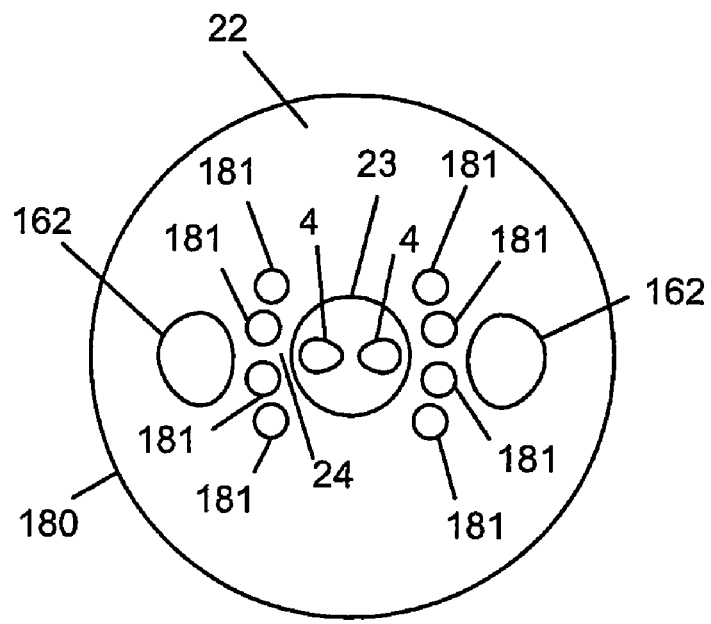
FIG. 18 shows an optical fibre comprising longitudinally extending holes.

FIG. 18 shows an optical fibre 180 comprising longitudinally extending holes 181 instead of the depressed cladding regions 161 of FIG. 16. The holes 181 can be filled with air or other low index material(s).

Figure 19:
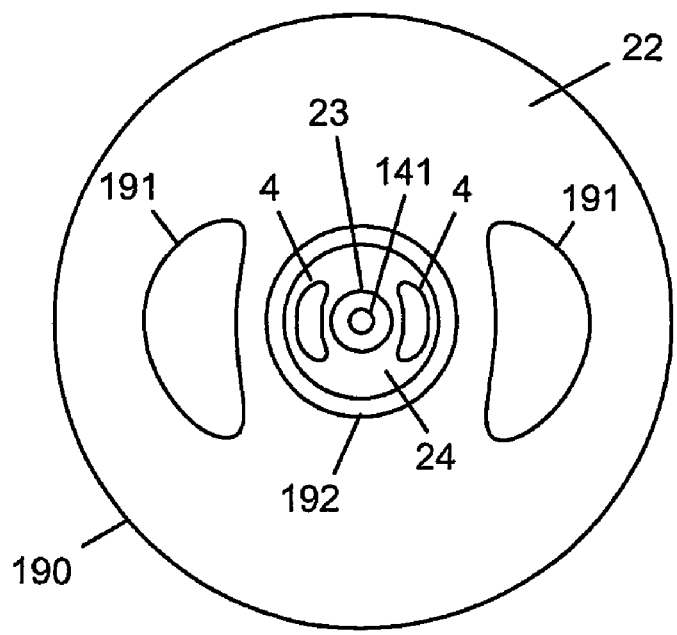
FIG. 19 shows an optical fibre comprising a raised index ring around the core.

FIG. 19 shows an optical fibre 190 comprising two depressed-index regions 191 and a raised index ring 192 surrounding the core 141. Such a waveguide design comprising the core 23 and raised index ring 192 is an example of a so-called large-mode area design. Large mode area fibres have fundamental-mode spot sizes significantly larger than found in traditional telecommunication fibres. The core 23 may have a refractive index difference compared to the substrate 22 of around 0.001 to 0.002 and a diameter of around 15 μm to 25 μm. The ring 192 may have a raised index of around 0.0002 to 0.001 compared to the substrate 22 and an outer diameter of around 40 μm to 80 μm.

Figure 20:
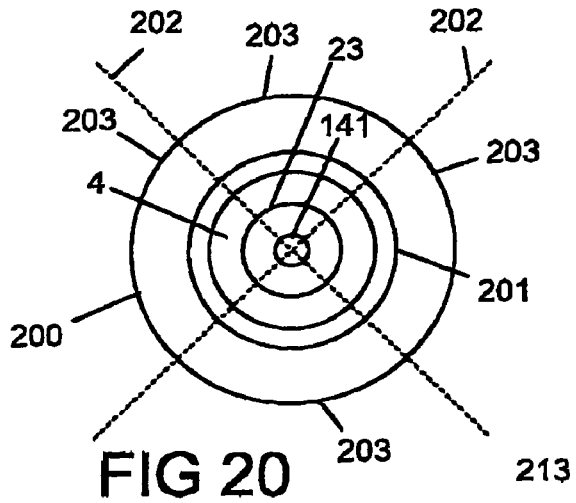
FIGS. 20 to 23 show manufacturing steps to fabricate the fibre shown in FIG. 19.

FIG. 20 shows the cross-section of an optical fibre preform 200 comprising a depressed index ring 201. The preform is sawn along the lines 202 to provide four longitudinally extending sections 203.

Figure 21:
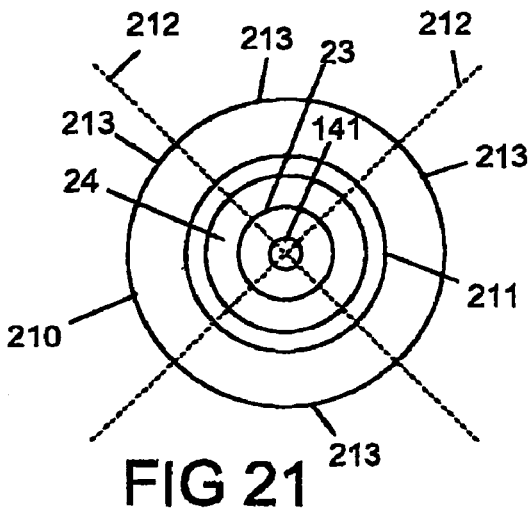

FIG. 21 shows the cross-section of a optical fibre preform 210 comprising a raised-index ring 211. The preform 210 is sawn along the lines 212 to provide four longitudinally extending sections 213.

Figure 22:
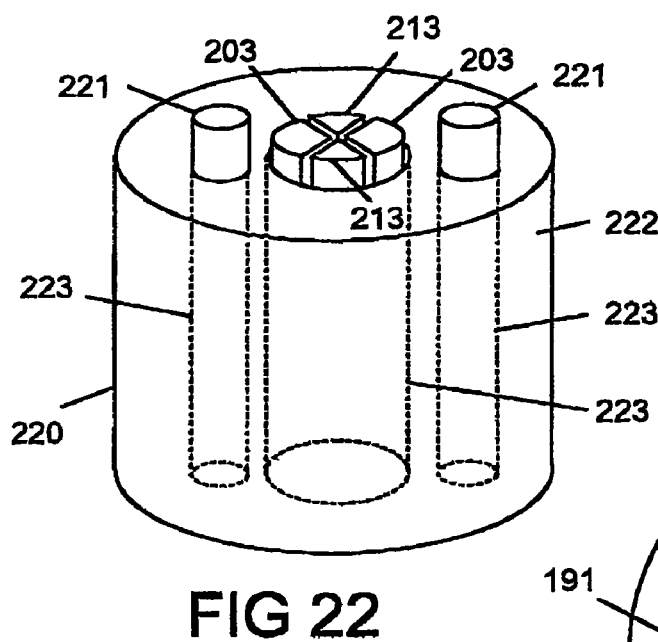

FIG. 22 shows a rod-in-tube preform assembly 220 comprising a substrate 222 comprising holes 223 configured to accept the sections 203 and 213 and stress applying rods 221. The substrate 222 is preferably fused silica, and the holes 223 can be machined using ultrasonic drilling.

Figure 23:
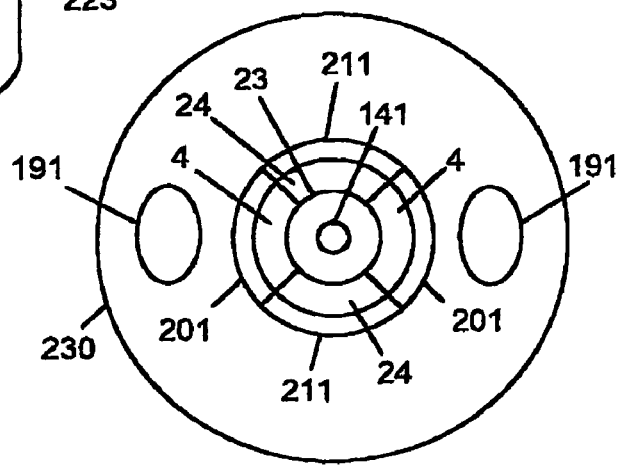

FIG. 23 shows the cross-section of the resulting fibre 230 drawn from the preform assembly 220. The fibre 230 has gain regions 4 and depressed index regions 201 in the axis of the stress applying regions 191, and inner cladding 24 and raised index regions 211 in the perpendicular direction. The method of manufacture described with reference to FIGS. 20 to 23 is preferred to avoid preform shattering when highly-stressed regions are allowed to heat and cool.

Figure 24:
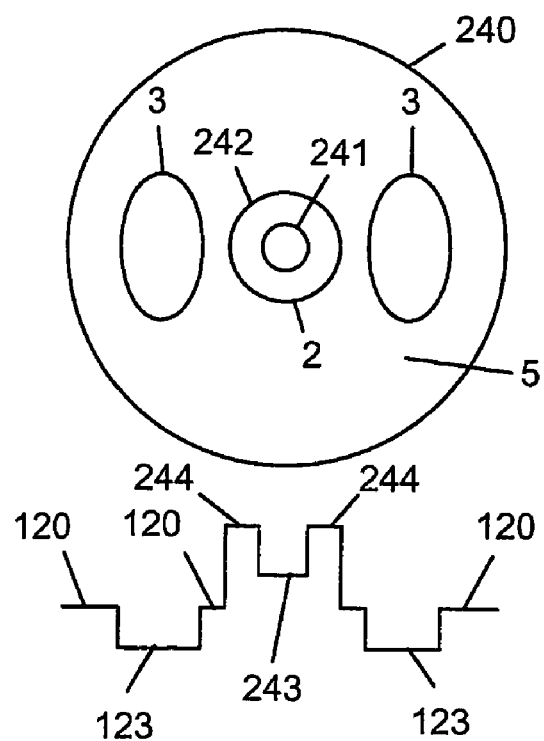
FIGS. 24 and 25 show optical fibres having ring cores.
Figure 25:
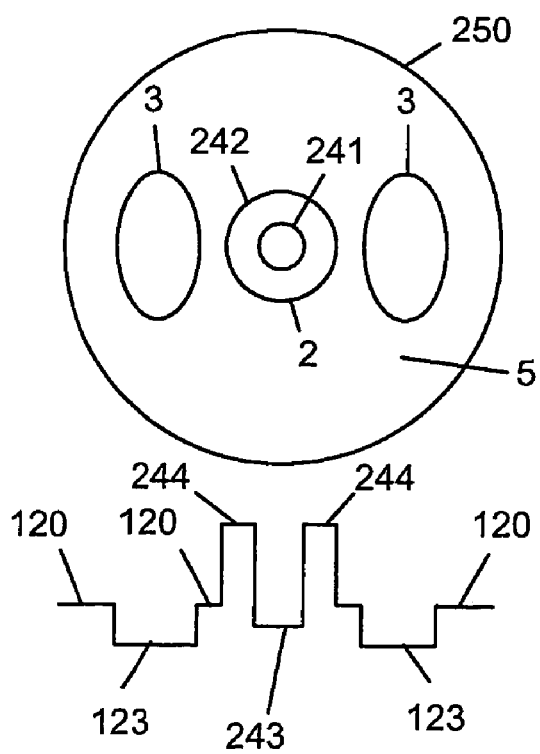

The examples provided above concentrate have shown fibres having traditional step-index cores. Other designs of waveguides 2 are also encompassed by the invention, including microstructured (or holey) fibres. In addition, ring-doped cores are also beneficial in some applications. FIG. 24 shows a ring doped fibre 240 in which the waveguide 2 comprises an inner core 241 and an outer core 242. The inner core 241 has a refractive index 243 which is less than the refractive index 244 of the outer core 242. FIG. 25 shows a similar fibre 250 in which the refractive index 243 is depressed with respect to the index 120. The gain medium 4 can be located in one or more of the inner core 241, the outer core 242 and the cladding 5.

It is to be appreciated that the embodiments of the invention described above with reference to the accompanying drawings have been given by way of example only and that modifications and additional components may be provided to enhance performance.

The present invention extends to the above mentioned features taken singly or in any combination.

We claim:

1. Apparatus comprising an optical fibre having a waveguide and at least one stress applying region, wherein:
   the waveguide is defined by a numerical aperture;
   the stress applying region is defined by a depressed refractive index;
   the optical fibre is configured such that the waveguide supports at an operating wavelength at least two polarised fundamental modes, two polarised first second-order modes, and two polarised second second-order modes;
   the waveguide comprises a gain medium;
   the optical fiber is disposed in a bend; and
   the stress applying region, the waveguide, the disposition of the gain medium, and the bend of the optical fiber are such:
      as to provide preferential guidance to at least one of the modes at the operating wavelength;
      the two polarised first second-order modes and the two polarised second second-order modes are leaky at the operating wavelength; and
      the optical fibre operates as a single polarisation optical fibre at the operating wavelength.

2. The apparatus of claim 1 wherein the gain medium comprises one or more rare-earth dopants.

3. Apparatus according to claim 2 in which the rare earth dopant comprises one or more of Ytterbium, Erbium, Neodymium, Praseodymium, Thulium, Samarium, Holmium, Europium, Terbium, and Dysprosium.

4. The apparatus of claim 1 wherein the optical fibre is defined by a length, and is tapered along its length.

5. The apparatus of claim 1 wherein the waveguide is defined by a length, and is tapered along its length.

6. The apparatus of claim 1 wherein the numerical aperture corresponds to an index difference less than 0.0035.

7. The apparatus of claim 1 wherein the numerical aperture corresponds to an index difference less than 0.003.

8. The apparatus of claim 1 wherein the numerical aperture corresponds to an index difference less than 0.0025.

9. The apparatus of claim 1 wherein the numerical aperture corresponds to an index difference less than 0.002.

10. The apparatus of claim 1 wherein the optical fibre comprises a photosensitive region.

11. The apparatus of claim 10 wherein which the photosensitive region is at least partly in the stress applying region.

12. Apparatus according to claim 10 in which the photosensitive region is at least partly in the waveguide.

13. The apparatus of claim 1 wherein the optical fibre is defined by a stimulated Brillouin scattering threshold, and the optical fibre has been exposed to ultraviolet radiation at least partly along its length in order to increase the stimulated Brillouin scattering threshold.

14. The apparatus of claim 1 wherein the optical fibre is defined by a stimulated Brillouin scattering threshold, and the optical fibre has been exposed to heat treatment at least partly along its length in order to increase the stimulated Brillouin scattering threshold.

15. The apparatus of claim 1 wherein the apparatus is in the form of an optical amplifying device.

16. The apparatus of claim 15 wherein the optical amplifying device is configured to provide single-polarisation operation.

17. The apparatus of claim 15 wherein the optical amplifying device is an optical amplifier, a laser, a master oscillator power amplifier, or a source of amplified spontaneous emission.

18. The apparatus of claim 1 wherein the optical fibre contains longitudinally extending holes along its length.

19. The apparatus of claim 1 wherein the bend is defined by an azimuth, and bend losses caused by the bend are tuned by controlling the azimuth.

20. The apparatus of claim 1 wherein the optical fibre comprises a depressed cladding region.

* * * * *